Sept. 28, 1943.   C. B. DE VLIEG   2,330,692
BORING TOOL
Filed July 24, 1942   2 Sheets-Sheet 1
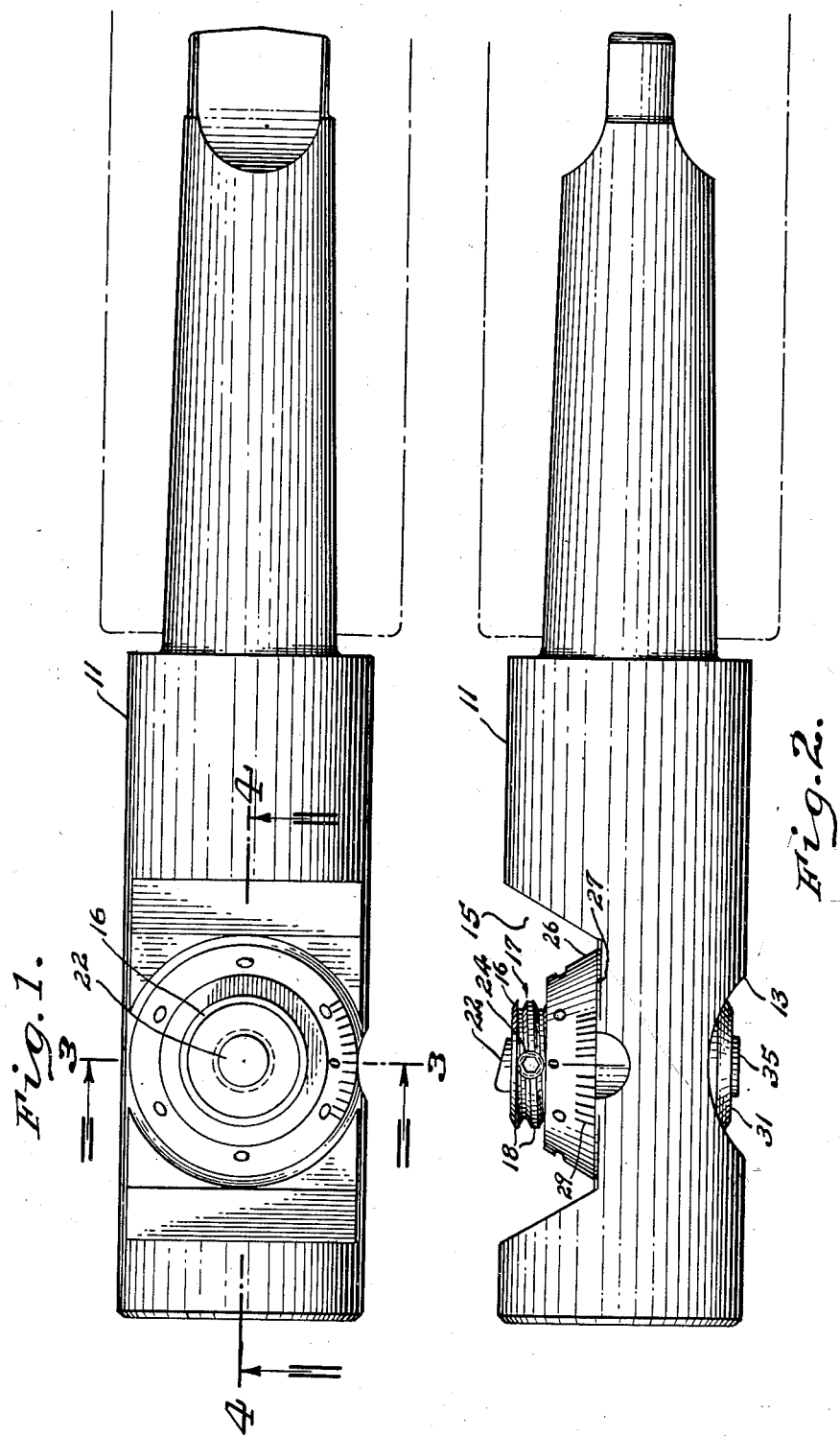
INVENTOR.
Charles B. DeVlieg
BY
Robert A. Sloman
ATTORNEY Sept. 28, 1943.   C. B. DE VLIEG   2,330,692
BORING TOOL
Filed July 24, 1942   2 Sheets-Sheet 2

INVENTOR.
Charles B. De Vlieg
BY
Robert A. Sloman
ATTORNEY

Patented Sept. 28, 1943

2,330,692

UNITED STATES PATENT OFFICE 2,330,692

BORING TOOL

Charles B. De Vlieg, Ferndale, Mich.

Application July 24, 1942, Serial No. 452,233

11 Claims. (Cl. 77—58)

This invention relates to rotary boring tools for use in boring operations, and more particularly to a boring tool having provisioned therein a transversely adjustable cutting means.

Heretofore in boring tools, to serve this purpose, considerable difficulty has been experienced in obtaining extremely accurate and fine adjustments. Structures have been such as to introduce backlash and other conditions that lack dependability for minute adjustments to a degree of .0001".

Likewise in boring tools of this type substantial trouble is encountered in maintaining a rigid and fixed relation between the cutter and the rotatable shank within which it is transversely disposed.

It is the object of the present invention to provide a novel cutter mounting transversely and slidably disposed within the shank of a boring tool, together with means for accurately adjusting the positioning of said cutter, together with cooperating means for securely locking the cutter housing in adjusted position, and taking up any possible slack which may exist between the tool shank and the housing, to thereby provide the ultimate of rigidity together with fully dependable and accurate means of adjustment.

It is the further object hereof to provide a tool adjusting means adapted to eliminate vibration between the cutter housing and the tool shank, to thereby guarantee that the boring operation will be unvarying and minutely accurate.

It is the further object of this invention to provide a compact cutter assembly for a boring tool consisting of a cutter housing slidably and transversely disposed within the tool shank, with an adjusting means threadably engaging said housing at one side of the cutter shank within a suitable recess, and a locking and retaining means cooperatively engaging said housing disposed within a suitable corresponding recess on the other side of said cutter shank.

The invention herein therefore relates to the various elements and their combinations as hereinafter fully set out and described and claimed in connection with the accompanying drawings of which:

Fig. 1 is a top plan view of the boring tool.

Fig. 2 is a side elevational view thereof.

Figure 3:
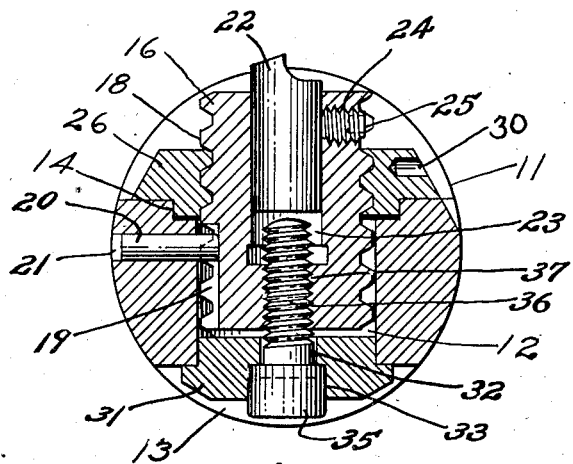
Fig. 3 is a section on line 3—3 of Fig. 1.

It will be understood that the above drawings merely illustrate a preferable embodiment of the invention, and that other embodiments are also contemplated within the scope of the claims hereinafter set out.

Referring to the drawings and particularly to Figs. 1 and 2, the boring tool consists of a tapered boring bar or shank 11 with the tapered portion being adapted for insertion within the rotatable spindle of a boring mill or other machine or device adapted for boring operations.

A transverse opening 12 is positioned within and adjacent the end of the boring bar 11, with an offset opening 13 in said bar at one end of opening 12, and another offset opening 14 at the other end thereof. The shank 11 is further angularly cut away at 15 to provide a support for the calibrated cutter adjusting means 26 hereinafter described. It will be understood that opening 12, though shown in the drawings at right angles to the longitudinal axis of boring bar 11, may also be angularly disposed therethrough.

Figure 4:
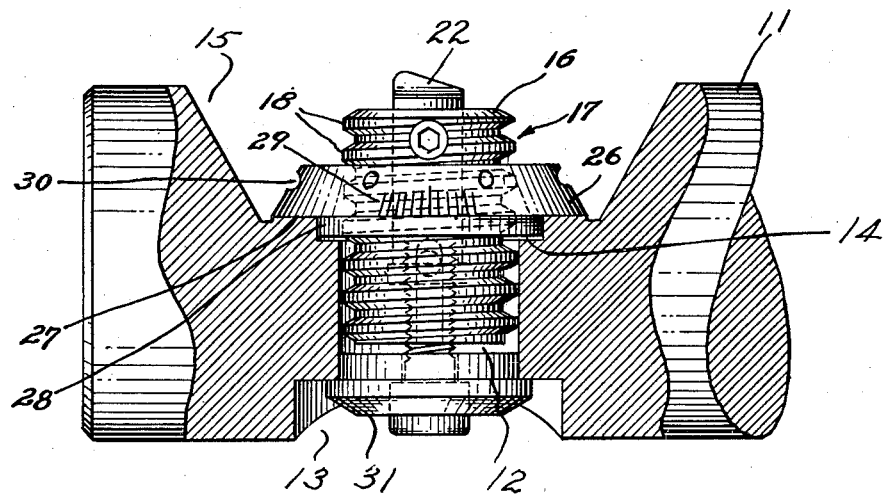
Fig. 4 is a section on line 4—4 of Fig. 1.

Referring to Figs. 3 and 4 a partially hollow cutter housing 16 is shown, exteriorly treaded at 17, and adapted for transverse sliding engagement within the hollow opening 12. The outer portions 18 of the threads 17 are relatively flat for sliding cooperative engagement with the inner surface of opening 12. It will be noted that said threads are flat to thereby provide a journaling surface characterized by a minimum of friction, to permit a reciprocable sliding adjustment of the cutter housing 16 within opening 12.

Housing 16 is partially longitudinally slotted at 19 to receive the guide pin 20 disposed within a suitable opening 21 within the shank or boring bar 11. Consequently it is seen that housing 16 is limited merely to non-rotative reciprocable sliding movement within the hollow opening 12.

A cutting tool 22 is longitudinally and centrally provisioned within the longitudinal recess 23 within the tool housing 16. A set screw 24, having preferably a socket head 25, is transversely and threadably journaled within the cutter housing 16 adapted for entry into the longitudinal opening 23 therein for cooperative and retaining engagement with the shank of the cutting tool 22. Transverse adjustment of the cutter 22 within its housing 16 and relative to the shank 11 is thereby permitted.

A calibrated micrometer disc 26 is disposed within the cut away portion 15 of shank 11 registering rotatably with the surface 27 formed in the shank 11. Adjusting disc 26 also has a cylindrical portion 28 of reduced diameter adapted for rotative movement within the offset recess 14, in shank 11 providing a journaling support therefor.

Said adjusting disc 26 calibrated at 29, is interiorly threaded for cooperative threaded engagement with the threaded portion on the transversely adjustable housing 16, whereby on rotative movement of disc 26 said housing is transversely adjusted within the opening 12 of boring bar 11.

A plurality of radially spaced openings 30 are provisioned peripherally around the disc 26 for the reception of a suitable spanner wrench if desired for adjustably and rotatably turning said disc. However, it will be noted that disc 26 is also manually rotatable for adjustment of the cutter housing 16 within the opening 12.

A retaining disc or means 31 is oppositely provisioned with respect to adjusting disc 26, nested within the cut away recess 13 in the boring bar 11; and a central opening 32 is provisioned therein offset at a greater diameter at 33.

A locking screw 35, preferably having a socket head, longitudinally disposed within openings 32 and 33 has a threaded shank portion 36 for cooperative threaded engagement within a corresponding interiorly threaded opening 37 within housing 16 communicating with the longitudinal opening 23 therein.

In operation it is seen that a rough but loose adjustment may be first obtained by manually actuating the screw 35 for approximately setting the adjustable housing 16 and the cutter 22 therein. To obtain an accurate adjustment the disc 26 is rotatably actuated to the desired reading and the screw 35 is then tightened thereby drawing up the entire cutter assembly into a rigid unit within and with respect to the opening 12 within the boring bar 11. Consequently all slack is taken up eliminating any possible vibration of the relative parts above described.

At the same time backlash is eliminated, with the result that the boring operation will be unvarying and extremely accurate with dependability for minute adjustments to a degree of one ten-thousandth of an inch (.0001").

Having described my invention, reference should now be had to the following claims for determining the scope thereof.

I claim:

1. A boring tool comprised of a shank portion with a transverse opening therein, a cutter housing slidably disposed within said opening having threaded means thereon, a cutting tool within said housing, operating means threadably engaging said threaded means at one end of said opening, and retaining means oppositely disposed from said operating means for fixedly maintaining said housing in adjusted position within said opening, whereby a dependable minute accurate cutter adjustment may be obtained.

2. A boring tool comprised of a boring bar having a transverse opening therein, a threaded cutter housing slidably disposed within said opening, a cutting tool within said housing and protruding therefrom, adjusting means threadably engaging said housing for transversely adjusting the same with respect to said boring bar, and retaining means oppositely disposed from said adjusting means for fixedly maintaining said housing in adjusted position within said opening, whereby a dependable minute accurate cutter adjustment may be obtained.

3. A boring tool comprised of a boring bar having a transverse opening therein and oppositely disposed recessed portions also therein at the ends of said transverse opening, a threaded cutter housing slidably disposed within said opening, a cutting tool secured within said housing, adjusting means within one of said recessed portions threadably engaging said housing for transversely adjusting the same with respect to said boring bar, and retaining means oppositely disposed from said adjusting means within said other recessed portion for fixedly maintaining said housing in adjusted position relative to said boring bar, whereby a dependable minute accurate cutter adjustment may be obtained.

4. A boring tool comprised of a boring bar with a transverse opening therein, and with oppositely disposed recessed portions on the ends of the said transverse opening, a cutter housing slidably disposed within said opening having threaded means thereon, a cutting tool within said housing, operating means rotatably disposed within one of said recessed portions threadably engaging said threaded means, retaining means oppositely disposed from said operating means within the other of said recessed portions and having a central opening therein, and a locking screw seated within said retaining means adapted to threadably engage said housing for rigidly securing the same in adjusted position within said boring bar, whereby a dependable minute accurate cutter adjustment may be obtained.

5. A boring tool comprised of a boring bar having a transverse opening therein, a threaded cutter housing slidably disposed within said opening, a cutting tool within said housing and protruding therefrom, means within said bar engaging said housing limiting movement thereof to sliding non-rotary movement, adjusting means threadably engaging said housing for transversely adjusting the same with respect to said boring bar, and retaining means oppositely disposed from said adjusting means for fixedly maintaining said housing in adjusted position within said opening, whereby a dependable minute accurate cutter adjustment may be obtained.

6. A boring tool comprised of a boring bar having a transverse opening therein and oppositely disposed recessed portions also therein at the ends of said transverse opening, a threaded cutter housing slidably disposed within said opening, a cutting tool secured within said housing, adjusting means within one of said recessed portions threadably engaging said housing for transversely adjusting the same with respect to said boring bar, and retaining means oppositely disposed from said adjusting means within said other recessed portion for fixedly maintaining said housing in adjusted position relative to said boring bar, the outer edges of the threads on said cutter housing being relatively flat for sliding engagement with the interior surface of said transverse opening, whereby a dependable minute accurate cutter adjustment may be obtained.

7. A boring tool comprised of a boring bar having a transverse opening therein and oppositely disposed recessed portions also therein at the ends of said transverse opening, a threaded cutter housing slidably disposed within said opening, a cutting tool secured within said housing, calibrated adjusting means within one of said recessed portions threadably engaging said housing for transversely adjusting the same with respect to said boring bar, and retaining means oppositely disposed from said adjusting means within said other recessed portion for fixedly maintaining said housing in adjusted position relative to said boring bar, whereby a dependable minute accurate cutter adjustment may be obtained.

8. A boring tool comprised of a boring bar having a transverse opening therein and oppositely disposed recessed portions also therein at the ends of said transverse opening, a threaded cutter housing slidably disposed within said opening, a cutting tool secured within said housing, calibrated adjusting means within one of said recessed portions threadably engaging said housing for transversely adjusting the same with respect to said boring bar, and retaining means oppositely disposed from said adjusting means within said other recessed portion for fixedly maintaining said housing in adjusted position relative to said boring bar, said adjusting means having provisioned therein a plurality of radially spaced openings for the reception of a suitable spanner wrench for adjustment thereof, whereby a dependable minute accurate cutter adjustment may be obtained.

9. A boring tool comprised of a shank portion with a transverse opening therein, a cutter housing slidably disposed within said opening having threaded means thereon, a cutting tool within said housing, operating means threadably engaging said threaded means at the end of said opening, and an adjusting screw oppositely disposed from said operating means adapted to engage said housing for fixedly maintaining the same in adjusted position within said opening, whereby a dependable minute accurate cutter adjustment may be obtained.

10. A boring tool comprised of a shank portion with a transverse opening therein, a cutter housing slidably disposed within said opening having threaded means thereon, a cutting tool within said housing, operating means threadably engaging said threaded means at one end of said opening, retaining means oppositely disposed from said operating means, and an adjusting screw provisioned through said retaining means for threadably engaging said housing for fixedly maintaining the same in adjusted position within said opening, whereby a dependable minute accurate cutter adjustment may be obtained.

11. A boring tool comprised of a shank portion with a transverse opening therein, a cutter housing slidably disposed within said opening having threaded means thereon, a cutting tool within said housing, calibrated adjusting means threadably engaging said threaded means at one end of said opening, and retaining means oppositely disposed from said operating means for fixedly maintaining said housing in adjusted position within said opening, whereby a dependable minute accurate cutter adjustment may be obtained.

CHARLES B. DE VLIEG.